March 24, 1970  D. DARDICK  3,501,998
OPEN CHAMBER BREECH MECHANISM WITH EXPLOSION ACTUATED CYLINDER
Filed Aug. 31, 1967  7 Sheets-Sheet 2
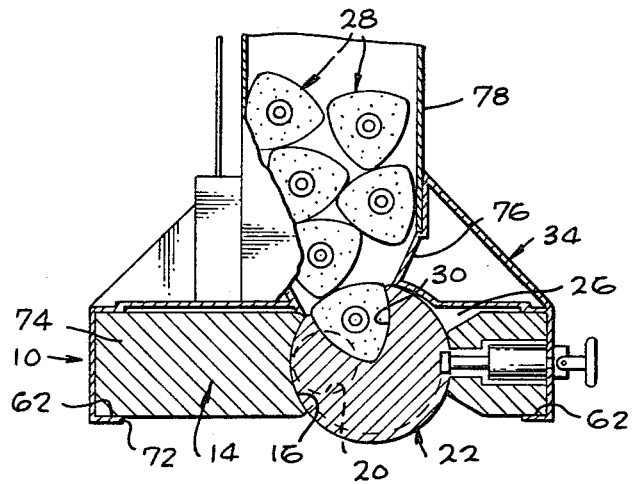
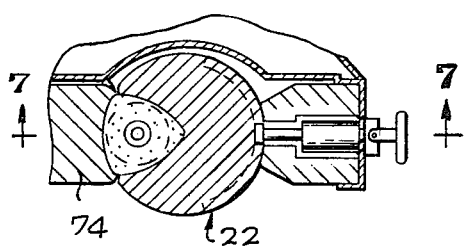
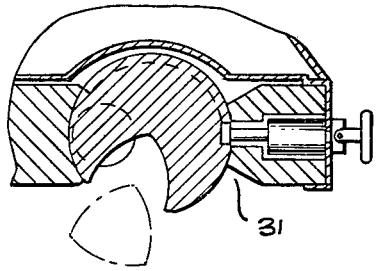
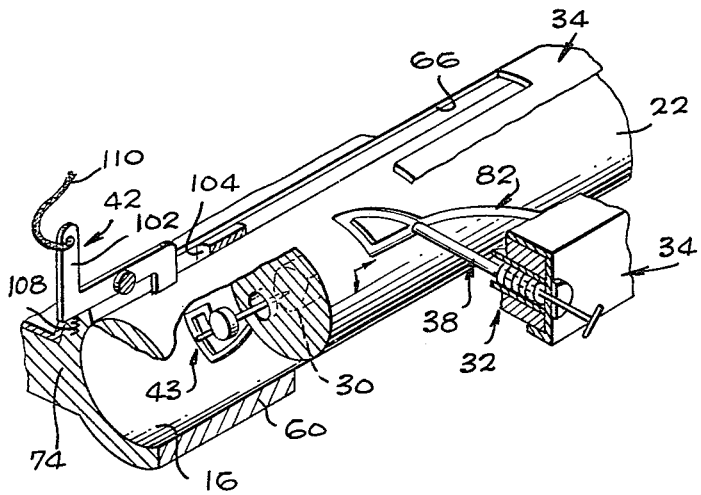
DAVID DARDICK
INVENTOR.
BY
ATTORNEY

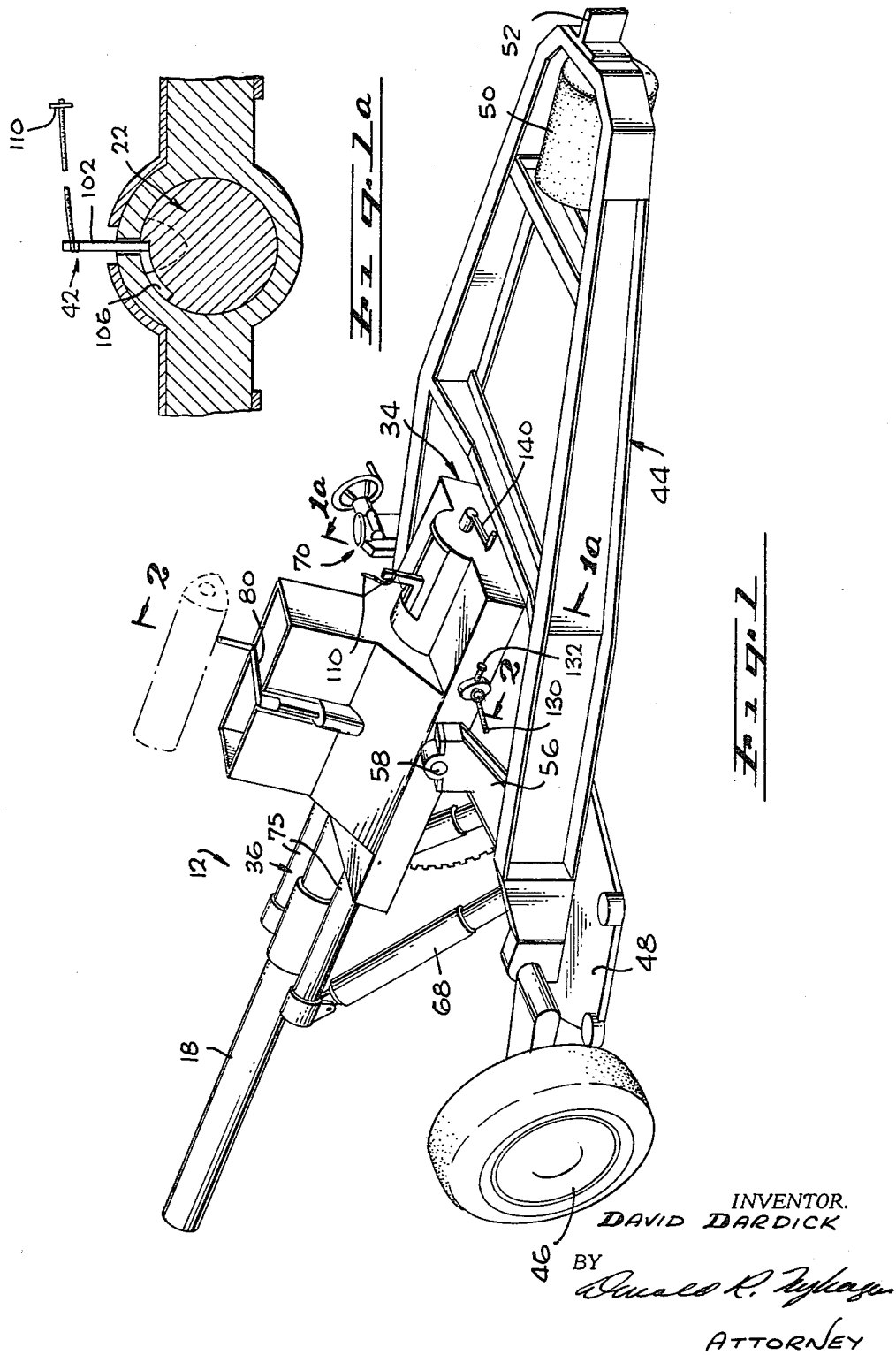

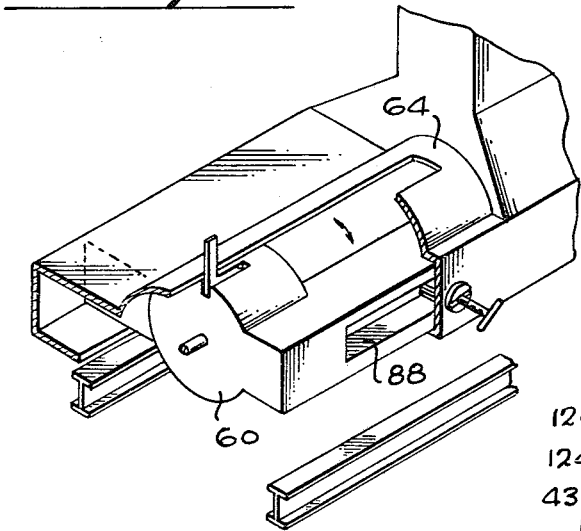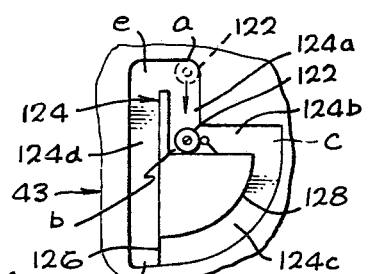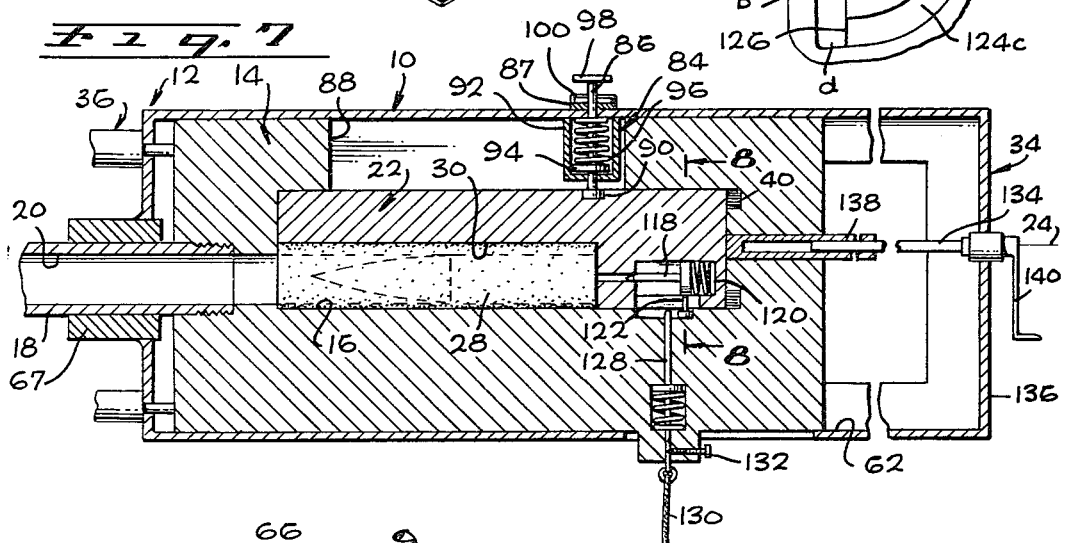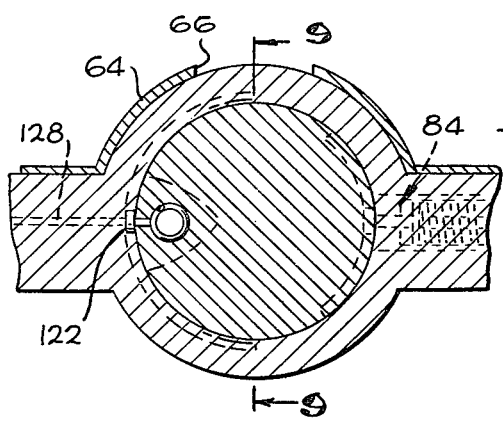

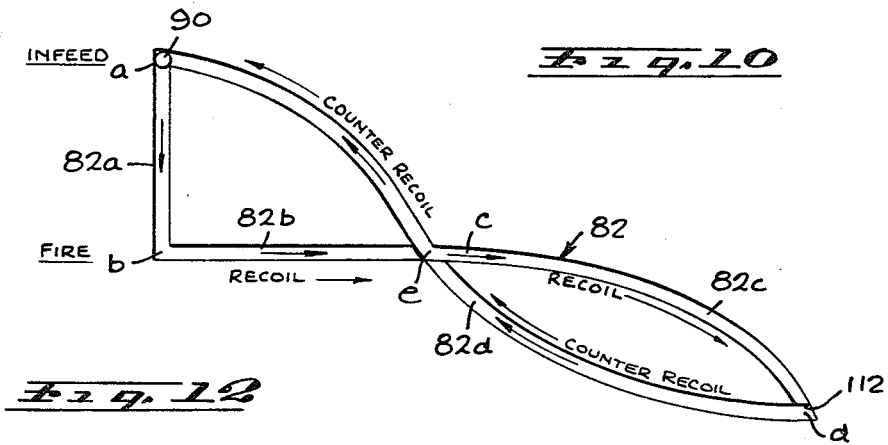
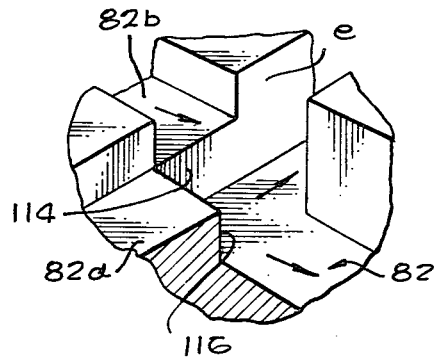
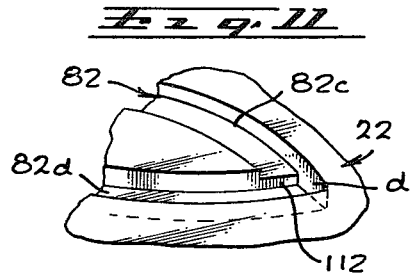
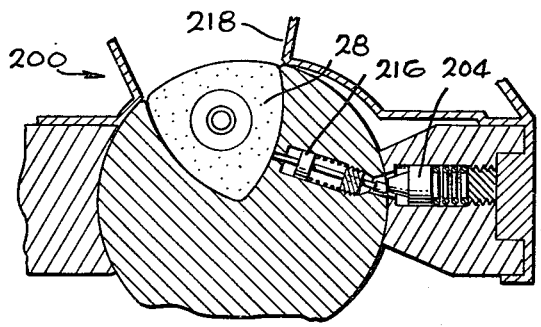
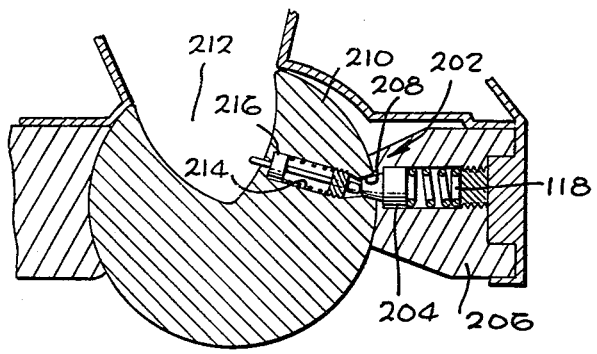
INVENTOR.
DAVID DARDICK
ATTORNEY March 24, 1970　　　D. DARDICK　　　3,501,998
OPEN CHAMBER BREECH MECHANISM WITH EXPLOSION ACTUATED CYLINDER
Filed Aug. 31, 1967　　　　　　　　　　　　7 Sheets-Sheet 5
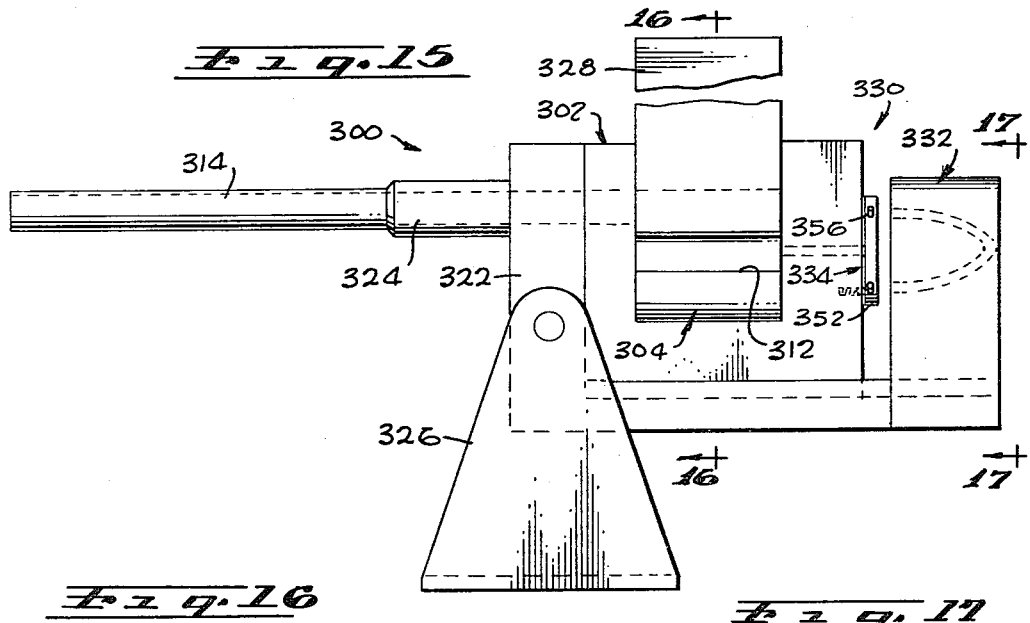
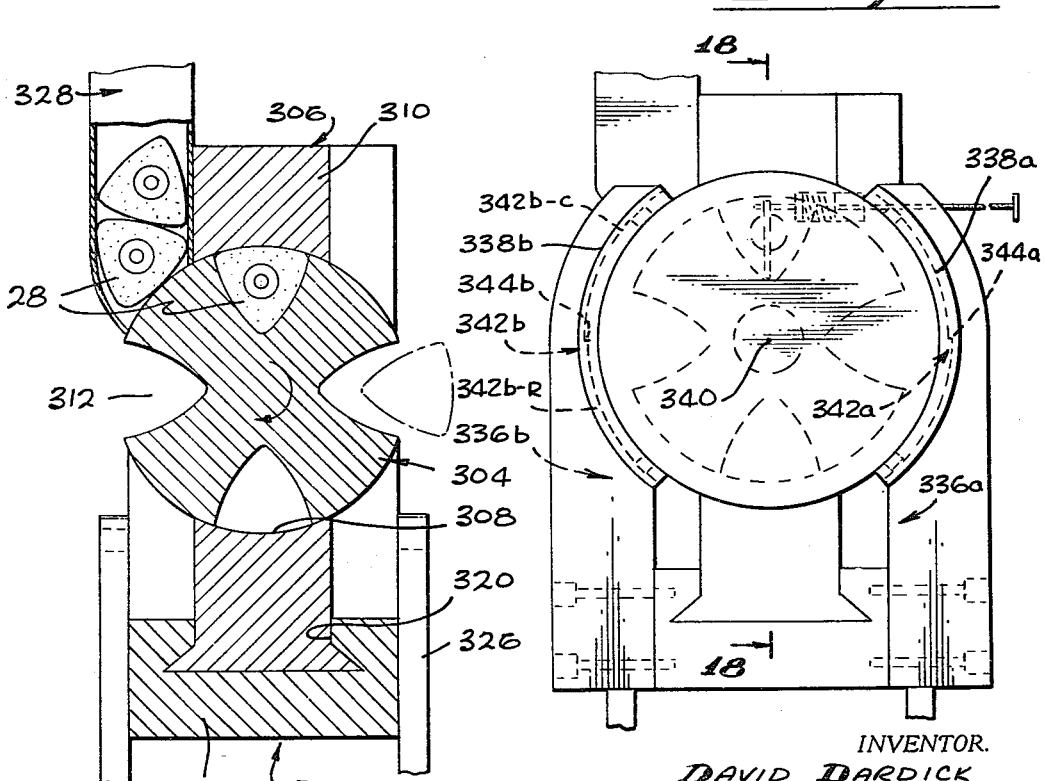
INVENTOR.
DAVID DARDICK
BY
ATTORNEY March 24, 1970            D. DARDICK            3,501,998
OPEN CHAMBER BREECH MECHANISM WITH EXPLOSION ACTUATED CYLINDER
Filed Aug. 1967            7 Sheets-Sheet 6
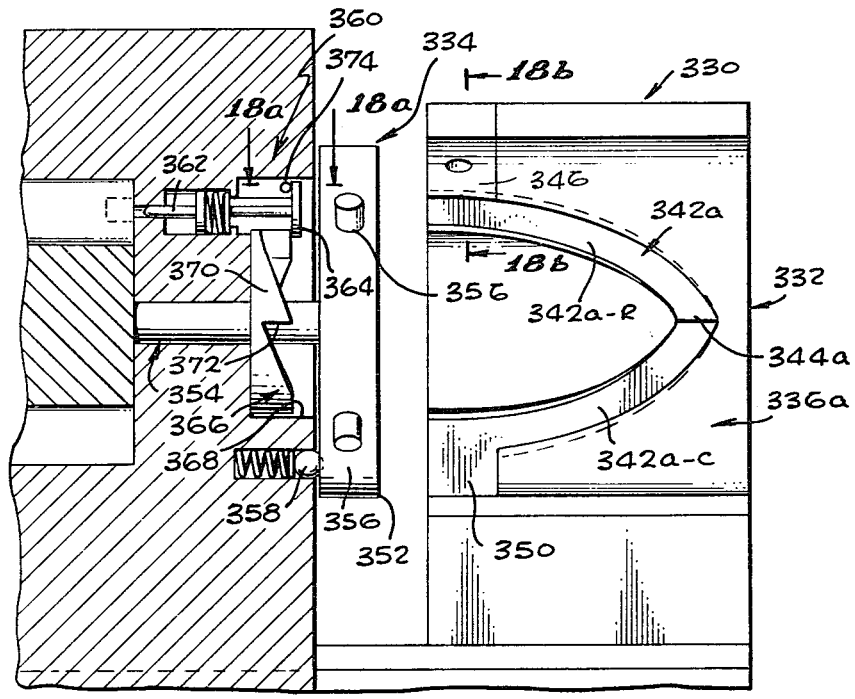
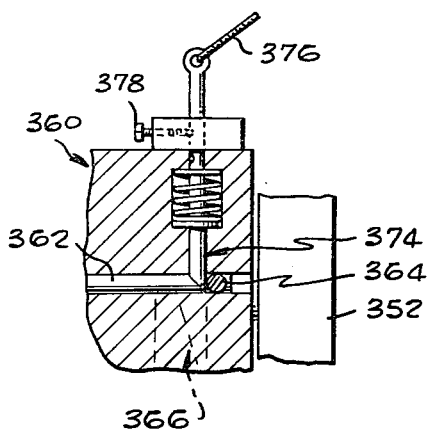
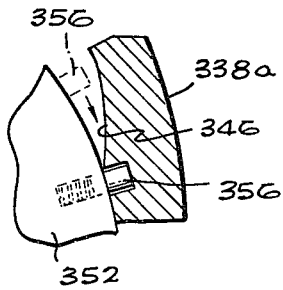
DAVID DARDICK
INVENTOR.
BY Donald R. Nyhagen
ATTORNEY

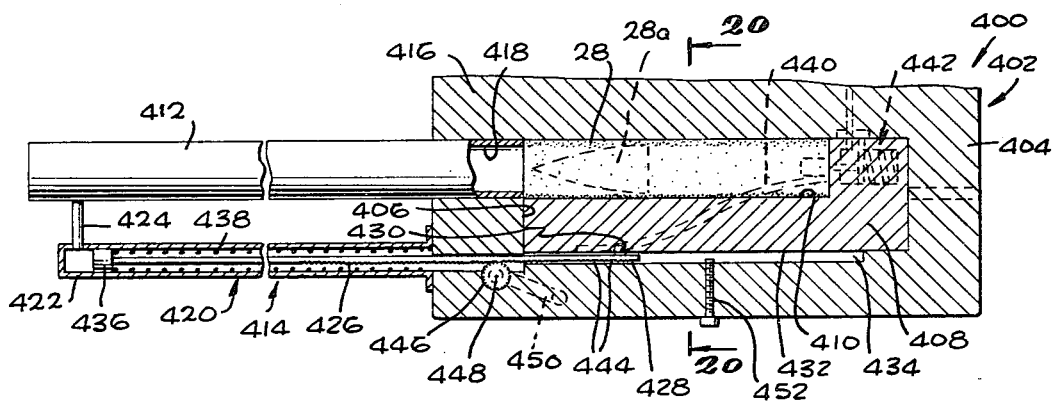
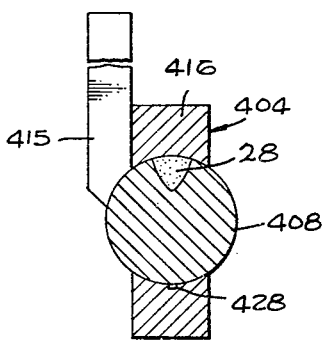 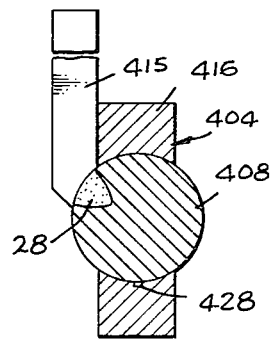 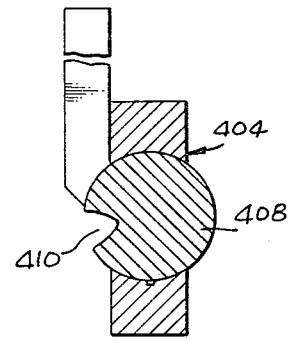
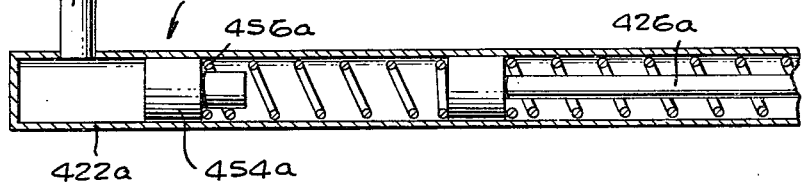

United States Patent Office 3,501,998
Patented Mar. 24, 1970

3,501,998
OPEN CHAMBER BREECH MECHANISM WITH EXPLOSION ACTUATED CYLINDER
David Dardick, Palos Verdes Peninsula, Calif., assignor to TRW Inc., Redondo Beach, Calif., a corporation of Ohio
Filed Aug. 31, 1967, Ser. No. 664,829
Int. Cl. F41d *5/04;* F41f *11/06*
U.S. Cl. 89—156                               14 Claims

ABSTRACT OF THE DISCLOSURE

An open chamber breech mechanism having a rotary open chamber carrier or cylinder, and explosion actuated means for driving the cylinder to ammunition infeed, firing, and ejection positions in response to firing of rounds in the mechanism.

COPENDING APPLICATIONS

Reference is made herein to copending applications Ser. No. 671,910, filed Sept. 1, 1967, now Patent No. 3,446,113, and entitled "Sealed Open Chamber Breech Mechanism and Caseless Ammunition Therefor," Ser. No. 665,136, filed Sept. 1, 1967, and entitled "Semicombustible Ammunition for Open Chamber Breech Mechanism," and Ser. No. 665,160, filed Sept. 1, 1967, and entitled "Ammunition Improvements to Permit Firing of a Conventional Closed Chamber Cartridge in an Open Chamber Breech Mechanism."

BACKGROUND OF THE INVENTION

Field of the invention

This invention relates generally to open chamber breech mechanisms. More particularly, the invention relates to an open chamber breech mechanism having explosion actuated means for driving the rotary open chamber carrier or cylinder of the mechanism to ammunition infeed, firing, and ejection positions in response to firing of rounds in the mechanism. The invention relates also to an open chamber gun embodying the breech mechanism.

As will appear from the ensuing description, the present open chamber breech mechanism has both weapon and non-weapon applications. In certain of these applications, the ammunition which is fired in the mechanism will contain both a projectile and a propellant charge, while in other applications, the ammunition will contain only a propellant charge. In this regard, attention is directed to the fact that the term "ammunition" as used in this disclosure is intended to encompass both projectile-type ammunition, i.e., ammunition including both a projectile and propellant charge, and projectileless ammunition, i.e., ammunition containing only a propellant charge. The principal application of the invention, however, is weapons and, for this reason, the invention will be disclosed in connection with its application to weapons, specifically guns.

Prior art

Open chamber guns are known in the art. Typical guns of this type, for example, are disclosed in Patent Nos. 2,983,223; 3,041,939; 2,831,401; 2,847,784; and 3,046,890. Generally speaking, these open chamber guns are characterized by an open chamber breech mechanism including a breech frame containing a rotary carrier or cylinder with one or more firing chambers which open laterally through the circumference of the cylinder. The cylinder is rotated or oscillated to locate each firing chamber successively in an ammunition infeed position, a firing positon, and an ejection position. In infeed position, the open side of each chamber registers with an ammunition infeed opening in the breech frame for laterally receiving a round of ammunition through the opening. In firing position, the breech frame closes the open side of each firing chamber to condition the breech mechanism for firing a round in the chamber. In ejection position, the open side of each firing chamber registers with an ejection opening in the frame through which the spent cartridge cases of cased ammunition and unfired rounds are laterally ejected. The prior art patents referred to above discloses various types of drive arrangements for driving the breech cylinder in this rotary or oscillatory motion.

SUMMARY OF THE INVENTION

This invention provides an open chamber breech mechanism characterized by novel explosion actuated means for driving its open chamber carrier or cylinder in an oscillatory or intermittent rotary motion to locate each cylinder firing chamber in ammunition infeed, firing and ejection positions. The present invention discloses two dfferent techniques for translating explosion into cylinder rotation or oscillation the explosion generated by firing of each ammunition round. In certain disclosed embodiments of the invention, for example, the breech mechanism is supported for recoil movement during firing and subsequent counter-recoil movement under the action of a counter-recoil mechanism. This recoil and counter-recoil movement of the breech mechanism is utilized to drive the cylinder in its oscillatory or rotary motion. In another disclosed embodiment of the invention, the breech mechanism employs a fluid pressure actuator, typically a linear fluid pressure ram, which is directly pressurized by the propellant gas produced during firing and drives the cylinder under the force of such gas pressure. According to a feature of these embodiments, the explosion induced motions, i.e., recoil-counter recoil motion and pressure responsive actuator motion, are converted to rotation or oscillation of the breech cylinder through the intermediate agency of a motion translating means, such as a cam. At this point, it is significant to recall that while the invention is disclosed in connection with its application to weapons, the carrier or cylinder actuating or driving means proposed by the invention may be employed in breech mechanisms for other non-weapon applications. The ammunition which is fired in the breech mechanism may be fully cased ammunition like that disclosed in the aforementioned patents, or semicombustible, caseless or jacketed conventional ammunition like that disclosed in the aforementioned copending applications.

BRIEF DESCRIPTION OF THE DRAWINGS

In the drawings:

FIG. 1 is a perspective view of a gun embodying an explosion actuated breech mechanism according to the invention;

FIG. 1a is an enlarged fragmentary section taken on line 1a—1a in FIG. 1;

FIG. 2 is an enlarged section taken on line 2—2 in FIG. 1 illustrating the breech cylinder in ammunition infeed position;

FIG. 3 is a fragmentary section similar to FIG. 2 illustrating the breech cylinder in firing position;

FIG. 4 is a fragmentary section similar to FIG. 2 illustrating the breech cylinder in ejection position;

FIG. 5 is an enlarged fragmentary longitudinal section in perspective, through the breech mechanism embodied in the gun of FIG. 1;

FIG. 6 is an enlarged fragmentary perspective view, partly in section, of the breech end of the gun in FIG. 1;

FIG. 7 is a section taken on line 7—7 in FIG. 3;

FIG. 8 is an enlarged section taken on line 8—8 in FIG. 7;

FIG. 9 is a section taken on line 9—9 in FIG. 8;

FIG. 10 is a flat development of a breech cylinder cam track embodied in the gun of FIG. 1;

FIG. 11 is an enlarged fragmentary perspective view of one portion of the cam track in FIG. 10;

FIG. 12 is an enlarged fragmentary perspective view, partly in section, of another portion of the cam track in FIG. 10;

FIG. 13 is a fragmentary section, similar to FIG. 2, through a modified explosion actuated breech mechanism which may be utilized in the gun of FIG. 1;

FIG. 14 is a fragmentary section similar to FIG. 13 illustrating the breech mechanism in a subsequent operating condition;

FIG. 15 is a side elevation of a gun embodying a further modified explosion actuated breech mechanism according to the invention;

FIG. 16 is an enlarged section taken on line 16—16 in FIG. 15;

FIG. 17 is an enlarged rear elevation looking in the direction of the arrows on line 17—17 in FIG. 15;

FIG. 18 is a section taken on line 18—18 in FIG. 17;

FIG. 18a is a section taken on line 18a—18a in FIG. 18;

FIG. 18b is a section taken on line 18b—18b in FIG. 18;

FIG. 19 is a fragmentary longitudinal section through a gun embodying a further modified explosion actuated breech mechanism according to the invention;

FIG. 20 is a section, on reduced scale, taken on line 20—20 in FIG. 19 illustrating the breech cylinder in firing position;

FIG. 21 is a section similar to FIG. 20 illustrating the breech cylinder in infeed position;

FIG. 22 is a section similar to FIG. 20 illustrating the breech cylinder in ejection position; and FIG. 23 is an enlarged fragmentary longitudinal section through modified cylinder actuating means which may be utilized in the gun of FIG. 19.

DESCRIPTION OF THE PREFERRED EMBODIMENTS

In general terms, the invention provides an open chamber breech mechanism, represented in FIGS. 1–12 of the drawings by the breech mechanism 10, which in this instance is embodied in a weapon 12, specifically an artillery weapon. In general terms, the breech mechanism 10 comprises a breech frame 14 containing a chamber 16 and having means 18 defining a bore 20 opening to the chamber. An open chamber carrier or cylinder 22 is rotatably supported on the breech frame 14, within the chamber 16, for turning on an axis 24. Opening laterally to the chamber 16, between the ends of the cylinder 22, is an ammunition infeed opening 26 for directing rounds 28 of ammunition in succession to the chamber. The breech cylinder 22 contains a firing chamber 30 which opens laterally through the circumference of the cylinder. The cylinder is rotatable in the chamber 16 to locate the firing chamber 30 in an ammunition infeed position (FIG. 2), a firing position (FIG. 3), and an ejection position (FIG. 4). When in infeed position, the open side of the firing chamber registers with the ammunition infeed opening 26 to permit lateral infeed movement of a live round 28 into the firing chamber. The firing chamber is closed by the breech frame 14 and communicates with the bore 20 when in firing position, thus to condition the breech mechanism 10 for firing the round in the chamber. When the firing chamber is rotated to ejection position, the open side of the chamber registers with an ejection opening 31 in the breech frame 14 to permit lateral ejection of the spent cartridge case of a cased ammunition round after firing. In this regard, it is assumed that the rounds 28 comprise fully cased ammunition. As noted earlier, however, and as will appear from the ensuing description, the present breech mechanism may be employed to fire uncased ammunition and semiconbustible ammunition of the kind disclosed in the aforementioned copending applications.

The breech mechanism 10, as thus far described, is essentially conventional. The primary contribution of the present invention resides in carrier or cylinder actuating means 32 for driving the open chamber carrier or cylinder 22 of the breech mechanism to locate its firing chamber 30 in infeed, firing, and ejection positions in sequence. According to the invention, the cylinder actuating means 32 comprise explosion actuated or powered means for driving the cylinder in response to firing of each round in the firing chamber 30. In the particular breech mechanism 10 which has been selected for illustration in FIGS. 1–12, the cylinder 22 contains a single firing chamber 30 and is driven in oscillation to locate its firing chamber in infeed, firing, and ejection positions.

As noted earlier, and as will become readily evident from the ensuing description, the explosion generated during firing may be utilized in various ways to drive the breech cylinder in rotation or oscillation, as the case may be. In the particular breech mechanism 10 illustrated in FIGS. 1–12, for example, the breech frame 14 is supported by a receiver or cradle 34 for recoil movement during firing along a direction line parallel to the cylinder axis 24. The breech mechanism is equipped with counter-recoil means 36 for arresting and cushioning recoil movement of the mechanism and then returning the latter forwardly to battery position. In this case, the cylinder actuating means 32 comprise coacting cam and cam follower means 38 on the cylinder 22 and cradle 34 for translating the recoil and counter-recoil movement of the breech mechanism relative to the cradle into rotation of the cylinder from firing position, through ejection position, to infeed position. Return means 40, in this instance a torsion spring acting between the breech frame 14 and the cylinder 22, are provided for returning the cylinder to firing position. The breech mechanism embodies latch means 42 for locking the cylinder in its infeed position at the end of the counter-recoil stroke. This latch means is manually released to permit return of the cylinder to firing position by its return spring 40. As will appear presently, however, the cylinder latch means may be released automatically.

Briefly, in operation of the illustrated open chamber breech mechanism 10, with the carrier or cylinder 22 initially in infeed position, FIG. 2, an ammunition round 28 enters the firing chamber 30 through the ammunition infeed opening 26. When the round is properly positioned in the firing chamber, the cylinder latch means 42 are released to permit rotation of the cylinder to firing position, FIG. 3, under the action of the cylinder return spring 40. At this point, the breech firing mechanism 43 is actuated to fire the round in the firing chamber. During the following recoil and counter-recoil strokes of the breech mechanism relative to its supporting cradle 34, the cam means 38 drive the cylinder 22 from firing position to ejection position, FIG. 4, wherein the spent cartridge case of the fired round is ejected through the frame ejection opening 31, and finally back to infeed position. The latch means 42 then re-engage to retain the cylinder in infeed position, thereby to complete one firing cycle and condition the firing chamber to receive a live round of ammunition to be fired during the next firing cycle.

Referring now in greater detail to the drawings, the gun 12 which embodies the illustrated open chamber breech mechanism 10 of the invention is an artillery weapon. This gun includes a carriage 44 mounting, at one end, wheels 46 and a firing pad 48, and, at the opposite end, a wheel 50 and a hitch 52 for connection to a towing vehicle. The wheels 46 and firing pad 48 are relatively adjustable to permit the carriage 44 to be supported on the wheels during towing of the gun on the firing pad during firing of the gun. Carriage 44 has provisions for supporting a pair of trunnion arms 56, forming part of the top carriage, which straddle and rotatably support trunnions 58 extending from opposite sides of the gun cradle 34. Conventional means are provided to obtain traversing or azimuth adjustment between the top carriage and the main bottom carriage.

The breech frame 14 of the breech mechanism 10 has the usual flat rectangular shape and is generally horizontally oriented in such a way that the ammunition infeed opening 26 and cartridge case ejection opening 31 are located at the top and bottom, respectively, of the frame. The rear end of the breech frame is generally cylindrically enlarged at 60, just to the rear of and in coaxial alignment with the carrier receiving chamber 16 in the frame. The rear end of the receiving chamber extends coaxially into the frame enlargement 60, as shown best in FIG. 5. The gun cradle 34 comprises, essentially, a hollow enclosure or housing containing the mechanism 10 and having interior longitudinal guideways 62 slidably receiving the longitudinal edges of the breech frame 14. These guideways support the breech mechanism for recoil and counter-recoil movement relative to the cradle. In this connection, it will be understood that the cradle is longitudinally dimensioned to accommodate the full recoil stroke of the breech mechanism. The upper wall of the gun cradle 34 has a central, upwardly arching portion 64 which curves up and over the breech frame enlargement 60 in the manner shown best in FIGS. 6 and 8. Extending through and along the crest of this arching wall portion is a slot 66 whose purpose will be explained presently.

In the particular open chamber gun illustrated, the means 18 which defines the bore 20 is a barrel secured to the front end of and extending forwardly from the breech frame 14, in spaced parallel relation to the axis 24 of the breech cylinder 22. Rigidly mounted on the front end of the gun cradle 34 is a sleeve bearing or guide 67 through which the barrel 18 slidably extends and which slidably supports the barrel during recoil and counter-recoil movement of the breech mechanism. Telescopic equilibrators 68 are connected between the counter-recoil means 36 and the carriage 44 to counterbalance the weight of the extending barrel. Gun 12 is equipped with the usual elevation and azimuth adjusting means 70. Opening through the underside of the gun cradle 34, in the region between its breech frame guideways 62, is an ejection opening 72 which registers with the ejection opening 31 in the breech frame 14.

As noted earlier, the firing chamber 30 of the open chamber breech mechanism 10 is rotatable with the breech cylinder 22 to an ammunition infeed position (FIG. 2) a firing position (FIG. 3), and an ejection position (FIG. 4). When the firing chamber is in infeed position, the chamber opens upwardly in registry with the ammunition infeed opening 26 in the breech frame 14. When the firing chamber occupies its firing position, the chamber opens horizontally toward and is closed by the firng strap 74 of the breech frame 14. In this position, the firing chamber is coaxially aligned with and opens forwardly to the gun bore 20, and the rear end of the firing chamber registers with the firing mechanism 43 in the rear end of the breech frame. When the firing chamber is in ejection position, the chamber opens downwardly and registers with the cartridge case ejection openings 31 and 72 in the breech frame and gun cradle.

In the normal standby condition of the gun 12, the open chamber breech mechanism 10 occupies its forward limiting or battery position (FIG. 7) at the front end of the gun cradle 34. When an ammunition round 28 is fired in the gun, the high pressure gas generated by the burning propellant charge in the round exerts a forward driving or propulsion force on the projectile of the round and an equal rearward recoil force on the breech mechanism 10. This recoil force drives the breech mechanism rearwardly in a recoil motion relative to the gun cradle 34. The counter-recoil means 36 are operatively connected between the front end of the breech frame 14 and the gun cradle 34 in such a way as to cushion and arrest this rearward recoil motion of the breech mechanism and then return the latter forwardly with a counter-recoil motion to battery position.

The particular gun 12 illustrated is equipped with an ammunition infeed guide 76 which opens downwardly to the interior of the cradle 34 and registers with the breech frame infeed opening 26 when the breech mechanism 10 occupies its forward battery position in the cradle. Above the infeed guide is an ammunition hopper 78 which is adapted to be loaded with ammunition rounds 28 by the gun crew. In some cases, the hopper may be replaced by a preloaded ammunition magazine. In this regard, attention is directed to the fact that the type of ammunition infeed employed in the weapon, i.e., a hopper feed or a preloaded magazine, may depend upon the type of ammunition to be fired. A preloaded magazine feed may be employed, for example, when firing fixed charge ammunition. When firing zone charge ammunition, on the other hand, the weapon will employ the illustrated hopper feed to permit setting of the appropriate zone charges in the individual ammunition rounds 28 by the gun crew. This hopper is equipped with a spring loaded follower 80 which engages the rounds in the hopper through a slot in a side wall of the hopper to urge the rounds toward the breech cylinder 22.

As noted earlier, a major feature of the present invention resides in the explosion actuated means 32 for driving the carrier or cylinder 22 to its infeed, firing, and ejection positions. It will be recalled that the actuating means 32 of the open chamber gun under consideration comprise cam means 38. The illustrated cam means has a cam track 82 formed in the circumference of the cylinder 22 and a cam follower 84 carried by the gun cradle 34. Referring to FIG. 5, 7, 8, and 10, it will be observed that the cam track 82 is formed by a groove which is machined into the circumference of the cylinder, opposite its firing chamber 30. This cam groove or track has a rear section 82a (FIG. 10) which extends circumferentially of the cylinder from position $a$ to position $b$, a linear section 82b which extends forwardly along the cylinder from position $b$ to position $c$, an arcuate section 82c which extends forwardly along the cures circumferentially about the cylinder from position $c$ to position $d$, and an arcuate section 82d which extends rearwardly along and curves circumferentially about the cylinder from position $d$ back to position $a$ in such a way that the latter section crosses section 82b at a position $e$. As will appear from the ensuing description, the cam track sections 82b, 82c, together constitute a recoil path of the cam track and the cam track section 82d constitutes a counter-recoil path of the track. Cam follower 84 comprises a shaft 86 which is slidable in a bearing 87 rigid on the gun cradle 34 and extends inwardly to the breech cylinder 22 through a longitudinal clearance slot 88 in the breech frame 14. Rotatably mounted on the inner end of the shaft 86, for turning on the axis of the shaft, is a follower roller 90 which engages in the cylinder cam track or groove 82. Surrounding and slidably supporting the inner end of the cam follower shaft 86 is a housing 92. This housing is rigidly fixed to the gun cradle 34 and extends through the breech frame clearance slot 88. Surrounding the cam follower shaft within this housing, and seating against a shoulder 94 on the shaft is a spring 96 for urging the cam follower toward the breech cylinder 22. A handle 98 is fixed to the outer end of the follower shaft to permit retraction of the follower roller 90 from the cylinder cam track 82 for reasons to be explained presently. A cross pin 100 on trhe shaft, which nomally engages in a slot in the shaft bearing 87, may be rotated to engage the end of the bearing when the cam follower is retracted, thus to retain the follower in its retracted position.

It is now evident, therefore, that during recoil and counter-recoil movement of the breech mechanism 10 relative to the cradle 34, the breech cylinder 22 and cam follower 84 undergo relative movement in such a way that the relative movement of the follower roller 90 with respect to the cylinder occurs along the cam track 82. As explained below, this relative movement of the roller along the cam track drives the cylinder in oscillatory movement through its infeed, firing, and ejection positions. It is obvious, of course, that during such recoil and counter-recoil movement of the breech mechanism, the follower roller remains stationary and the cam track travels past the roller. For convenience in the ensuing discussion, however, it will be assumed that the cam track remains stationary and the roller moves along the track.

According to the present invention, the cam track 82 is so shaped that when the breech mechanism 10 occupies its forward battery position of FIG. 5 and the breech cylinder 22 occupies its ammunition infeed position of FIG. 2, the cam follower roller 90, or follower as it will be hereinafter referred to, is located at position $a$ of the cam track. Rotation of the cylinder from its infeed position to its firing position of FIG. 3, with the breech mechanism in battery position occurs under the action of the cylinder spring 40 and results in relative movement of the follower along the rear circumferential cam track section 82a from position $a$ to position $b$. When the weapon is ready for firing, therfore, the follower is located at position $b$ in the cam track. Assume now that weapon is fired. During the following rearward recoil stroke of the breech mechanism 10 relative to the gun cradle 34, the follower undergoes relative movement along the cam track sections 82b, 82c, i.e., along the recoil path of the track, from position $b$ through $c$, to position $d$. During the initial portion of the recoil stroke, the relative movement of the follower occurs along the longitudinal section 82b of the recoil path to retain the cylinder 22 in firing position until gun bore evacuation has occurred and the firing chamber pressure has dropped sufficiently to permit cylinder rotation. The follower then undergoes relative movement along the arcuate section 82c of the recoil path which is curved in such a way as to effect rotation of the cylinder 22 from its firing position of FIG. 3 to its ejection position of FIG. 4. When the follower is located at its forward limiting position $d$ in the recoil path of cam track 82, therefore, the firing chamber 30 occupies its ejection position. The counter-recoil means 36 are designed to arrest the recoil movement of the breech mechanism 10 within a stroke length equal to relative travel of the follower, longitudinally of the cylinder 22, between the two end positions $b$ and $d$ of the recoil path of the cam track 82.

At this point, breech mechanism 10 is driven forwardly through its counter-recoil stroke back to its battery position of FIG. 2 by the counter-recoil means 36. During this counter-recoil movement of the breech mechanism, the cam follower 90 undergoes relative movement along the counter-recoil section or path 82d of the cam track 82. This counter-recoil path of the cam track spirals around the breech cylinder 22 in such a way that relative movement of the follower along the path drives the cylinder from its ejection position of FIG. 4, through its firing position of FIG. 3, back to its ammunition infeed position of FIG. 2. The cylinder is then relocked in infeed position by the cylinder latch means 42 to complete the firing cycle. At the conclusion of the cycle, therefore, the cam follower 90 is again located at position $a$ in the cylinder cam track 82.

It is now evident that during each firing cycle of the illustrated weapon 12, the breech cylinder 22 is rotated from ammunition infeed position to firing position while the breech mechanism 10 remains in its forward battery position, from firing position to ejection position during the recoil stroke of the breech mechanism occasioned by firing of a round 28 in the mechanism, and from ejection position back to infeed position during the following counter-recoil stroke of the mechanism. Rotation of the cylinder from ejection position through firing position to infeed position during each counter-recoil stroke of the breech mechanism 10 stresses the cylinder spring 40 in a direction to urge the cylinder toward its firing position. Accordingly, when the cylinder occupies its ammunition infeed position of FIG. 2 at the outset of the firing cycle, wherein the cam follower 90 is located at position $a$ of the cylinder cam track 82, the spring exerts a torque on the cylinder for driving the latter to its firing position of FIG. 3. In the particular weapon 12 illustrated, the cylinder 22 is locked in its infeed position by the releasable latch means 42 at the conclusion of each firing cycle. Various latch means may be employed for this purpose. The illustrated cylinder latch means 42 comprise a latch member 102 which is pivotally mounted within a slot 104 in the crest of the rear enlargement 60 on the breech frame 14 for movement between latching and released positions. When in latching position, one end of the latch member engages in a latch groove 106 (FIG. 1a) machined in the cylinder 22 for locking the latter against rotation to firing position by the cylinder spring 40. When in released position, the latch member clears the latch groove to release the cylinder for rotation to firing position under the action of the cylinder spring. Latch member 102 is yieldably urged to latching position by a spring 108 (FIG. 5) which acts between the member and the breech frame 14.

The latch member extends through the crest slot 66 in the gun cradle 34 and may carry a lanyard 110 for manual tripping of the member to its released position when the breech mechanism 14 occupies its battery position. It is evident at this point, therefore, that rotation of the breech cylinder 22 to its infeed position at the conclusion of each firing cycle of the weapon 14 results in re-engagement of the latch member 102 in the cylinder latch groove 106 to lock the cylinder in infeed position. Tripping the latch member to its released position releases the cylinder 22 for rotaation from infeed position to firing position under the action of the cylinder spring 40. Engagement of the cam follower 90 with the longitudinal wall of the cam track 82 upon arrival of the follower at position $b$ in the cam track positively indexes the cylinder in firing position to condition the gun for firing.

At this point, attention is directed to FIGS. 11 and 12 which illustrate steps machined into the floor of the cam track 82 to assure proper relative movement of the cam follower 90 along the track in the manner explained above. The step 112 shown in FIG. 11 is located at the forward position $d$ of the cam track to prevent return of the follower along the recoil path 82c during counter-recoil movement of the breech mechanism 10. Steps 114, 116 shown in FIG. 12 are located at position $e$ of the cam track to prevent the follower from entering the counter-recoil path 82d during relative recoil movement of the follower through position $e$ and to prevent the follower from entering the recoil path 82b during relative counter-recoil movement of the follower through position $e$. It will be understood that the cam follower spring 96 constantly urges the follower toward the cylinder, whereby the follower 90 will ride along the floor of and over the steps in the cam track.

As noted earlier, each ammunition round 28 is fired in the gun 12 by actuation of the firing means 43 upon rotation of the cylinder 22 to firing position. This firing means may be actuated either manually or automatically in response to rotation of the breech cylinder 22 to firing position. To this end, the firing means comprises (FIGS. 5, 7, 8 and 9) a firing pin 118 which is slidably mounted in the breech cylinder rearwardly of and on the axis of the firing chamber 30. The pin is urged forwardly by a spring 120. Fixed to and extending laterally from the firing pin through a slot in the cylinder is a cam follower 122. The outer end of the cam follower engages in a cam track 124 formed in the wall of the cylinder receiving chamber 16 in the breech frame 14. Cam track 124 is shaped as shown in FIG. 9 so that when the breech cylinder 22 is located in its infeed position of FIG. 2, the cam follower 122 is located at position *a* in the track, as indicated in broken lines. Rotation of the cylinder from infeed position to firing position (FIG. 3) under the action of the cylinder spring 40 results in movement of the follower from position *a* to position *b* along the circumferential cam track section 124*a*. When the cylinder is located in firing position, then, the follower 122 occupies its full line position of FIG. 9, wherein the follower is situated at the rear end of a longitudinal section 124*b* of the cam track. The firing pin 118 is then released for forward movement by the pin spring 120 into impact with the primer of the ammunition round 28 in the cylinder firing chamber 30 to fire the round. At the instant of firing, therefore, the follower 122 is located at position *c* in the cam track 124 at the forward end of the cam track section 124*b*.

At this point, it is significant to recall that during each recoil stroke of the breech mechanism 10 following firing of a round 28, the breech cylinder is rotated in one direction to ejection position. The cylinder is then rotated in reverse direction from ejection position, through firing position, back to infeed position during the following counter-recoil stroke of the breech mechanism. In the course of recoil rotation of the cylinder from firing position to ejection position, the cam follower 122 on the firing pin 118 travels from position *c* to position *d* of the cam track 124 and along an arcuate section 124*c* of the track. This section spirals around the wall of the cylinder receiving chamber 16 in such a way that the firing pin is retracted rearwardly against the action of its spring 120. During final counter-recoil rotation of the cylinder back to infeed position, the follower 122 moves along a circumferential portion 124*d* of the cam track 124 from position *d* to position *c* to retain the firing position in its retracted or cocked position. The cam track floor is stepped at 126 to assure movement of the follower along the track section 124*d*. Upon arrival at position *e*, the follower and firing pin are released for limited forward movement under the action of the firing pin spring 120 to locate the follower at position *a* in the cam track in readiness for the next firing cycle. It is now evident, therefore, that the firing pin 118 is released to fire a round 28 upon rotation of the breech cylinder 22 to firing position. The firing pin is then cocked for firing the next round during the following recoil and counter recoil strokes of the breech mechanism 10.

From the description thus far, it will be understood that the breech cylinder 22 is latched in infeed position when the gun 12 is in its standby or battery position. Firing of the gun is initiated by pulling on the lanyard 110 to retract the cylinder latch member 102 and thereby release the cylinder for rotation to its firing position under the action of the cylinder spring 40. The firing pin 118 is released automatically to fire the round 28 currently in the firing chamber 30 in response to rotation of the cylinder to firing position. After firing, the firing pin is recocked and the cylinder is returned to and relatched in infeed position.

In some cases, it may be desirable to have the cylinder rotate to and remain in firing position without firing of the gun. To this end, the breech mechanism 10 is equipped with a spring loaded stop pin 128 which is normally extended inwardly by spring pressure to a position (FIGS. 7 and 9) in front of the firing pin cam follower 122 when the latter is located at position *b* of its cam track 124. When thus extended, the stop pin blocks forward movement of the firing pin 118 to fire the round 28 in firing position. Under these conditions then, the cylinder 22 will rotate to firing position without firing of the gun. The gun is fired by retracting the stop pin 128 to release the firing pin. To this end, the stop pin may be equipped with a lanyard 130 for pulling the stop pin to its retracted position. If desired, a detent latch 132 may be provided for selectively retaining the stop pin in its retracted position after the pin is manually retracted, thus to effect automatic firing of the gun in the manner explained.

Under certain conditions, it may be desirable or necessary to rotate the breech cylinder 22 from one position to another by hand while the breech mechanism 10 remains in its forward battery position. For example, if the cylinder firing chamber 30 is located in firing position when empty, it will be necessary to initially rotate the cylinder to infeed position by hand, in order to condition the gun for firing. In other cases, it may be necessary to rotate the cylinder from firing position to ejection position by hand to eject an unfired or misfired round 28. To this end, a shaft 134 is rotatably mounted in the rear wall 136 of the gun cradle 34, on the axis 24 of the breech cylinder 22, in such a way that the shaft is restrained against axial movement relative to the wall. Shaft 134 is telescopically engaged with and keyed against rotation relative to a shaft 138 secured to and extending coaxially from the rear end of the breech cylinder and rotatably through the rear end of the breech frame 14. Shafts 134, 138 are capable of sufficient relative telescoping movement to accommodate the full recoil stroke of the breech mechanism 10. Releasably secured to the rear end of the shaft 134 is a crank 140. Thus, the breech cylinder 22 may be rotated by hand by mounting the crank 140 on the shaft 134 and turning the crank in the appropriate direction.

It is evident, of course, that the breech cylinder 22 may be rotated from firing position to infeed position to receive a first ammunition round 28 and thereby condition the gun for firing without retracting the cylinder cam follower 84 from the cylinder cam track 82. When manually rotating the cylinder from firing position to ejection position to eject an unfired or misfired round, on the other hand, the cam follower 84 must be retracted from its cam track 82, in the manner explained earlier. Also, the firing pin stop 128 must be retracted to permit the firing pin cam follower 122 to move freely along its cam track 124.

Attention is now directed to FIGS. 13, 14 illustrating a modified open chamber gun 200, according to the invention, having automatic cylinder latch means 202 in place of the manual cylinder latch means 42 employed in the gun 10, just described. Gun 200, except for the modified latch means, is identical to the gun 10. Accordingly, it is unnnecessary to describe the gun 200 in complete detail. Suffice it to say that the automatic latch means 202 of the latter gun comprises a spring loaded detent 204 which is carried by the breech frame 206 and is engageable in a socket 208 in the breech cylinder 210 when the latter occupies the infeed position of FIGS. 13 and 14. Socket 208 is located opposite the cylinder firing chamber 212 and is spaced from the cylinder cam track (not shown in FIGS. 12 and 14). Extending laterally through the cylinder is a bore 214 which opens at one end to the inner end of the detent socket 208 and at the other end through a side wall of the firing chamber 212. A spring loaded detent release pin 216 is slidably fitted and captivated within the bore. When the firing chamber 212 is empty, the pin 216 is yieldably urged to its position of FIG. 13, wherein the inner end of the pin projects into the firing chamber. The outer end of the pin is then retracted from the detent socket 208 to permit latching engagement of the detent 204 in the socket, as shown in FIG. 13. When thus engaged in the socket, the detent locks the breech cylinder 210 in its infeed position. The modified gun 200 is otherwise identical to the earlier describe gun 10 of the invention.

The cylinder latch means 202 are release automatically, to release the breech cylinder 210 for rotation from infeed position to firing position under the action of the cylinder spring (not shown), by each ammunition round 28 entering the cylinder firing chamber 212 from the ammunition hopper 218. In this regard, it will be observed that a round 28 entering the firing chamber depresses the detent release pin 216 to its detent releasing position of FIG. 14. In this position, the pin engages and retracts the cylinder latching detent 204 from the cylinder detent socket 208. The contacting ends of the latching detent and release pin are then flush with the outer surface of the cylinder 210, as shown. Accordingly, the cylinder is released for rotation from infeed position to firing position by the cylinder spring.

It is now evident, therefore, that the operation of the gun 200 is essentially the same as that of the earlier described gun 10 except that the breech cylinder 210 is released automatically, for rotation from infeed position to firing position in response to entrance of each around 28 into the cylinder firing chamber 212. Thus, if the stop (not shown) for the firing pin (not shown) is retained in its retracted position in the manner explained earlier in connection with the gun 10, the gun 200 will continue to fire automatically until the ammunition hopper 218 is emptied.

In the event that the detent 204 is so located that it undergoes relative movement across the cam track in the cylinder 210 during rotation of the cylinder between infeed, firing, and ejection positions, the diameter of the tip end of the detent is made somewhat larger than the width of the cam track to prevent the detent from entering the track.

Reference is now made to FIGS. 15 through 18b illustrating an automatic gun 300 according to the invention embodying a modified open chamber breech mechanism 302. This breech mechanism includes a breech cylinder 304 which is driven in one direction of rotation through its ammunition infeed, firing, and ejection positions in response to firing of ammunition rounds 28 in the gun. Breech mechanism 302 comprises a breech frame 306 having a chamber 308 containing the cylinder 304 and opening through opposite sides of the frame. Breech frame 306, like the breech frames in the earlier open chamber guns of the invention, has a flat rectangular shape. In this instance, however, the breech frame is vertically oriented in such a way that the firing strap 310 of the frame is located at the top of the frame, and the chamber 308 opens horizontally rather than vertically, as in the earlier gun. Moreover, the breech cylinder 304 contains a number of uniformly spaced firing chambers 312, rather than a single firing chamber as do the oscillatory cylinders in the earlier guns. Secured to and extending forwardly from the front end of the breech frame 306 is a barrel 314. The firing chambers 312 are coaxially aligned with this barrel when the chambers occupy their respective firing positions, wherein the chambers are closed by the breech frame firing strap 310.

Breech frame 306 is slidably supported on a cradle 316 for recoil and counter-recoil movement of the frame relative to the cradle. To this end, the cradle includes a lower longitudinal member 318 containing a beveled guideway 320. This guideway slidably receives the lower edge of the breech frame 306, which is shaped to complement the guideway, as may be best observed in FIG. 16. Rising from the front end of the lower cradle member 318 is an upright cradle member 322 mounting a counter-recoil housing 324 through which the barrel 314 extends. Contained within this housing is a counter-recoil mechanism (not shown) for arresting recoil motion of the breech mechanism 302 and barrel 314 and returning the same to their forward battery position of FIG. 16. The gun cradle 316 is pivotally supported on a mount 326 for training of the gun in elevation.

Mounted on one side of the breech frame 306 are ammunition infeed means 328. In this instance, the ammunition infeed means comprise a simple ammunition hopper 328 for laterally feeding the ammunition rounds 28 in succession to the cylinder firing chambers 312 through one open side of the cylinder receiving chamber 308 upon rotation of the firing chambers to their infeed positions. This open side of the chamber 308, then, forms an ammunition infeed opening in the frame. The opposite open side of the chamber defines an ejection opening.

In the gun 300 under discussion, as in the earlier open chamber gun of the invention, the explosion generated during firing of each ammunition round 28 in the breech mechanism 302 drive the latter rearwardly in a recoil motion relative to the cradle 316. This recoil motion of the breech mechanism is cushioned and arrested by the counter-recoil mechanism contained within the counter-recoil housing 324. Thereafter, the counter-recoil mechanism returns the breech mechanism forwardly in a counter-recoil stroke to its battery position of FIG. 15. The gun 300 is equipped with actuating means 330 for driving the breech cylinder 304 in intermittent unidirectional rotation to locate each of its firing chambers 312 in ammunition infeed, firing, and ejection positions in sequence. As in the previous embodiments of the invention, the cylinder actuating means 330 are effectively operated or powered by the explosion generated in the breech mechanism 302 during firing of each ammunition round 28 and, more specifically, by the recoil and counter-recoil movement of the breech mechanism which occurs during firing.

To this end, the cylinder actuating means 330 comprise cam means 332 on the gun cradle 316 and cam follower means 334 on the breech cylinder 304. The cam means 332 comprise a pair of cam members 336a, 336b which are rigidly attached to opposite sides of the lower longitudinal member 318 of the gun cradle 316, adjacent the rear end of the member. Cam members 336a, 336b have upper confronting cam plates 338a, 338b, respectively, which are cylindrically curved about the axis 340 of the breech cylinder 304. Formed in the inner confronting cylindrically curved surfaces of these cam plates are cam grooves or tracks 342a, 342b, respectively. Cam tracks 342a, 342b are essentially identical in shape but are inverted relative to one another. Thus, the upper section 342a–r and lower section 342a–c of the cam track 342a define recoil and counter-recoil paths, respectively, while the lower section 342b–r and upper section 342b–c of the cam track 342b define recoil and counter-recoil paths, respectively. Formed in the floor of the cam track 342a, at the juncture of its recoil and counter-recoil paths, is a step 344a which define a downwardly presented shoulder. A similar step 344b is formed in the cam track 342b at the juncture of its recoil and counter-recoil paths. This latter step defines an upwardly presented shoulder. Steps 344a, 344b are located substantially in a common plane normal to the plane of the breech frame 306 and containing the cylinder axis 340. The forward ends of the recoil and counter-recoil paths of the cam track 342a, 342b extend parallel to the cylinder axis for a short distance and open through the front ends of their respective cam plates 338a, 338b. Rearwardly of their longitudinally extending forward ends, the recoil and counter-recoil paths of each cam track 342a, 342b curve toward and join one another in the plane of the cam track steps 344a, 344b.

Formed on the cam plate 338a adjacent the front and upper edges of this plate in FIG. 18 is a camming ramp 346. This ramp extends laterally and upwardly from the upper wall of the front end of the upper recoil path 342a–r of the cam track 342a and recedes outwardly in the upward direction, as shown in FIG. 18b. Also in FIG. 18, it will be seen that the cam plate 338a is machined adjacent the front and lower edges of the plate to provide a clearance recess 350 flush with the floor of the counter-recoil path 342a–c of the cam track 342a. This recess opens laterally through the lower side of the front end of the counter-recoil path. Cam plate 338b has a camming ramp and recess similar to the ramp 346 and recess 350 of the cam plate 338a. The ramp and recess of the cam plate 338b are disposed in the same relationship relative their respective cam track recoil and counter-recoil paths 342b–r, 342b–c. It will be understood, therefore that the positions of the ramp and recess of the cam plate 338b are reversed relative to the ramp and recess of the cam plate 338a. That is to say, the ramp of the cam plate 338b is located adjacent the front and lower edges of this plate and the recess is located adjacent the front and upper edges of the plate. The purpose of these ramps and recesses will be explained presently.

It will be recalled that the cylinder actuating means 330 of the gun 300 under discussion further comprises cam follower means 334 on the gun cylinder 304. Cam follower means 334 includes a cam follower disc 352 located rearwardly of the breech frame 306. Coaxially secured to and extending forwardly from this disc and rotatably through the rear end of the breech frame, on the cylinder axis 304, is a shaft 354. The front end of the shaft 354 is secured to the rear end of the breech cylinder 304. Cam follower disc 352 mounts, about its perimeter, a number of uniformally spaced radially projecting spring loaded cam followers 356. These cam followers may comprise rollers and are equal in number to the number of firing chambers 312 in the breech cylinder 304. In this instance, therefore, the cam follower disc 352 mounts four cam followers 356. When the breech mechanism 302 occupies its forward battery position of FIGS. 15 and 18, the follower disc 352 is located a small distance forwardly of the cam plates 338a, 388b. The radius of the disc is just slightly less than the radius of curvature of the inner cylindrically curved surfaces of the cam plates.

The cam tracks 342a, 342b and the cam followers 356 are arranged in such a way that when the breech mechanism 302 occupies its forward battery position with one of the cylinder firing chambers 312 in firing position, the cam followers are aligned with the open forward ends of the cam tracks. More specifically, the upper right hand and lower left hand followers 356 in FIG. 17 are aligned with the open forward ends of the recoil paths 342a–r, 342b–r of the cam tracks. The remaining followers are aligned with the open forward ends of the counter-recoil paths 342a–c, 342b–c of the cam tracks. Assume now that an ammunition round 28 is fired in the firing chamber 312 currently in firing position. The recoil force then exerted on the breech mechanism 302 drives the latter rearwardly in its recoil stroke. Thereafter the counter-recoil means of the gun returns the breech mechanism forwardly in its counter-recoil stroke. During these recoil and counter-recoil strokes of the breech mechanism, the upper right hand and lower left hand cam followers 356 in FIG. 17 initially enter and then travel rearwardly along the recoil paths of the cam tracks 342a, 342b and finally forwardly along the counter-recoil paths of the cam tracks. These paths are curved in such a way that the follower disc 352, and hence the breech cylinder 304, are rotated in a clockwise direction in FIG. 17 through an angle approximating one half the angular spacing between the adjacent firing chambers 312 during the recoil stroke and through the same angle in the same direction during the counter-recoil stroke. The cam track steps 344a, 344b are located to block forward return of the cam followers during counter-recoil along the recoil paths of the cam tracks, and thereby assure return of the followers along the counter-recoil paths. The cam followers are spring loaded in the radial direction of the follower disc 352 to enable the followers to ride over and snap outwardly behind the shoulders defined by the steps. It is evident at this point, therefore, that during recoil and counter-recoil motion of the breech mechanism 302, following firing of each ammunition round 28 in the mechanism, the breech cylinder 304 is rotated from one firing position to the next.

Rotation of the breech cylinder 304 from one firing position to the next should not commence until bore evacuation has occurred, and the firing chamber pressure has dropped to a low level. This delay in rotation of the breech cylinder is accomplished, in part by the clearance spacing between the cam followers 356 and the forward ends of the recoil paths of the cam tracks 342a, 342b when the breech mechanism occupies its battery position of FIGS. 15 and 18, and in part by longitudinal extension of the forward ends of the recoil paths. In this regard, it will be understood that the cylinder actuating means 330 is so constructed and arranged that the time delay involved in rearward recoil movement of the cam followers 356 from their forward battery position of FIGS. 15 and 18 to the rear ends of the forward longitudinal sections of the cam track recoil paths is equal to or slightly greater than the time required for bore evacuation to occur after firing. During the remaining portion of the recoil stroke and the following counter-recoil stroke of the breech mechanism, the breech cylinder is rotated from its current firing position to its following firing position, in the manner explained above.

It is evident, of course, that the breech cylinder 304 must be releasably retained in firing position following firing of each ammunition round 28 and until the cam followers 356 enter the cam tracks 342a, 342b. It is further evident that the cylinder must be again releasably retained in its following firing position upon emergence of the cam followers from the cam tracks at the conclusion of the corresponding counter-recoil stroke of the breech mechanism 302. To this end, the breech frame 306 contains a spring loaded detent 358 which is engagable in recesses (not shown) in the rear face of the cam follower disc 352 for releasably retaining the breech cylinder 304 in each firing position. Thus, when each ammunition round 28 is fired, the breech cylinder is retained in its current firing position until the cam followers 356 enter the cam tracks 342a, 342b and in its following firing position after the cam followers emerge from the cam tracks.

The camming ramps 346 and the clearance recesses 350 on the cam plates 338a and 338b are provided to prevent jamming of the cylinder actuating means 330. In this regard, it will be observed that during recoil of the breech mechanism 302, the two right hand cam followers 356 in FIG. 17 enter the two open ends of the cam track 342a simultaneously and the two left hand cam followers enter the two open ends of the cam track 342b simultaneously. As a consequence, in the absence of the clearance recesses 350 initial rotation of the cam follower disc 352 under the camming action of the cam tracks on the cam followers would cause jamming of the inactive followers, i.e., the followers currently located in the counter-recoil paths of the tracks, against the trailing sidewalls of these paths relative to the direction of rotation of the disc. The clearance recesses 350 permit these inactive cam followers to emerge laterally from the counter-recoil paths during such initial rotation of the disc. It will be further observed that as the breech mechanism 302 approaches its battery position at the conclusion of counter-recoil, these two inactive cam followers 356 approach the forward ends of the recoil paths of the cam tracks laterally, as indicated in phantom lines in FIG. 18b. The camming ramps 346 cam these inactive followers inwardly, radially of the follower disc, against spring pressure at the conclusion of counter-recoil. In this regard, it will be observed in FIG. 18b that as each inactive cam follower laterally approaches its respective cam track recoil path, the follower engages and is cammed inwardly by its ramp. Thus, the inactive cam followers are permitted to laterally enter the forward ends of their respective cam track recoil paths at the conclusion of the counter-recoil without jamming the cylinder actuating means.

Gun 300 is equipped with firing means 360 for firing each ammunition round 28 in firing position. The illustrated firing means comprise a spring loaded firing pin 362 which is supported within the rear end of the breech frame 306 for axial movement along an axis which coincides with the longitudinal axis of each firing chamber 312 when in firing position. Rigid on the rear end of the firing pin is a crossbar 364. The lower end of this crossbar, as viewed in FIG. 18, forms a cam follower. This cam follower rides on the rear face of a cam disc 366 fixed to the breech cylinder shaft 354. Cam disc 366 is contained within a counterbore 368 which enters the rear end of the breech frame on the axis of the cylinder shaft bore. The rear face of the cam disc is formed with a number of circumferentially extending, axially presented inclined ramps, 370. Each ramp terminates in a circumferentially facing shoulder or step 372. The ramps and steps are equal in number to the breech cylinder firing chambers 312. The ramp steps are disposed approximately in planes, respectively, containing the firing chamber and breech cylinder axes.

It is evident at this point that during intermittent rotation of the breech cylinder 304 by the cylinder actuating means 330 in response to recoil and conter-recoil motion of the breech mechanism 302, the cam disc 366 rotates past the firing pin cam follower 364 to periodically retract the firing pin 362 against spring pressure and then abruptly release the forward firing movement in timed relation to cylinder rotation. The cam disc steps 372 are located to release the firing pin in response to rotation of each firing chamber 312 to firing position. It will be observed that the firing pin is retracted after each firing concurrently with rotation of the aligned cylinder firing chamber from firing position. The slope angle of the cam disc ramps 370 is such that the firing pin is retracted sufficiently to clear the trailing wall of ech firing chamber prior to its arrival in a position of alignment with the pin, thus to prevent shearing of the pin by the wall.

As will appear presently, it may be desirable to lock the firing pin 362 in its retracted or cocked position. To this end, the firing means 360 are equipped with a spring loaded stop pin 374. This stop is spring urged to its extended position of FIG. 18a, wherein the stop is located in front of the firing pin crossbar 364. In this extended position of the stop, therefore, the firing pin is held in its retracted position. The inner end of the stop 374 is beveled, as shown, whereby the firing pin will automatically retract the stop during retraction of the firing pin by the firing cam 366. The stop will then snap back to its extended position to retain the firing pin in its retracted position. The firing pin is released to fire the gun by manually retracting the stop. To this end, the stop may be equipped with a lanyard 376. Preferably, releasable latch means 378 are provided for selectively retaining the stop in its retracted position in response to manual retraction of the stop by pulling on the lanyard 376.

The gun 300 is conditioned for firing by filling the ammunition hopper 328 with ammunition rounds 28 and manually rotating the breech cylinder 304 to locate the first round in firing position. This manual rotation of the cylinder may be accomplished by rotating the cylinder cam disc 352. At this time, the stop 374 is extended to retain the firing pin 362 in its retracted position upon movement of the firing pin to this position by such manual rotation of the breech cylinder. The first round is fired by pulling on the lanyard 376 to retract the stop and thereby release the firing pin for spring movement into impact with the primer of the round. During subsequent recoil and counter-recoil of the breech mechanism 302 the cylinder actuating means 330 drives the cylinder from one firing position to the next. In the event that cased ammunition is being fired, the cartridge case of the fired round is then rotated to ejection position and ejected, and a live round rotated to firing position, as shown in FIG. 16. If the stop pin latch means 378 are set to retain the stop 374 in its retracted position, the gun will continue to fire automatically until the hopper 328 is empty. The gun may be fired manually by setting the latch means 378 to release the stop 374 for return of the latter to its extended position after each firing. In this case, the firing pin 352 will be retained in its retracted position after each firing, whereby each round must be fired manually by pulling on the lanyard 376.

The disclosure thus far has related to one particular technique for utilizing the explosion generated during firing to drive the breech cylinder to infeed, firing, and ejection positions. FIGS. 19 through 22 illustrate a modified open chamber gun 400 according to the invention which utilizes an alternative technique for driving the breech cylinder. The modified gun 400, which has been illustrated in simplified fashion, comprises an open chamber breech mechanism 402 having a breech frame 404. Within the breech frame is a chamber 406 containing a rotary open chamber cylinder 408. Cylinder 408 has a single firing chamber 410 which opens laterally through the circumference of the cylinder and longitudinally through the front end of the cylinder. Secured to and extending forwardly from the front end of the breech frame 404 is a barrel 412 which is coaxially aligned with the cylinder firing chamber 410 when the latter occupies its illustrated firing position.

Embodied in the gun 400 are cylinder actuating means 414 for driving the breech cylinder 408 in oscillation to infeed, firing, and ejection positions. In the gun 400, as in the earlier oscillating cylinder guns, the open side of the firing chamber 410, when in infeed position (FIG. 21) registers with an ammunition infeed hopper 415 to permit lateral infeed movement of an ammunition round 28 into the chamber. When in its firing position (FIG. 20) the open side of the firing chamber is closed by the breech frame firing strap 416 and the chamber opens forwardly to the bore 418 in the gun barrel 412. When in ejection position (FIG. 21) the open side of the firing chamber registers with an ejection opening in the breech frame.

The illustrated cylinder actuating means 414 comprise a linear fluid pressure actuator 420. This actuator includes a cylinder 422 which is secured at its rear end to and extends forwardly from the front end of the breech frame 404 in spaced parallel relation to the gun barrel 412. The forward end of the actuator cylinder is closed and communicates with the forward end of the bore 418 through a propellant gas conduit 424. Slidably fitted within the actuator cylinder 422 is an actuator plunger 426. Plunger 426 has a rod 428 extending rearwardly through the cylinder and the breech frame 404 along the side of the cylinder receiving chamber 406 opposite the breech frame firing strap 416. On the rear end of this rod is a cam follower 430. Follower 430 projects laterally into the cylinder receiving chamber 406 through a communicating slot 432 between the chamber and the plunger rod receiving bore 434 in the breech frame 404. Rigid on the front end of the plunger rod 428 is a piston 436 which slides in and is sealed to the wall of the actuator cylinder 422. A spring 438 encircling the plunger rod between the breech frame 404 and the piston 436 serves to urge the actuator plunger 426 to its forward limiting position in the actuator cylinder 422.

The projecting inner end of the actuator plunger cam follower 430 engages in cam groove or track 440 formed in the surface of the breech cylinder 408 opposite its firing chamber 410. A forward section of the cam track 440 extends longitudinally of the breech cylinder. The remaining portion of the cam track spirals about the cylinder, as shown.

When the actuator plunger 426 occupies its forward limiting position of FIG. 19 in the actuator cylinder 422, the cam follower 430 on the plunger engages in the forward longitudinal section of the cylinder cam track 440. Assume now that the plunger is driven rearwardly in the cylinder and then returned to its forward limiting position. During the rearward stroke of the plunger, the cam follower 430 travels rearwardly along the cam track 440 and drives the breech cylinder 408 in the counterclockwise direction as viewed in FIGS. 20 through 22. During the subsequent forward return stroke of the plunger, the cam follower travels forwardly along the cam track and drives the breech cylinder in the opposite or clockwise direction. According to the present invention, the actuator plunger 426 is driven in its rearward stroke by propellant gas pressure. In this regard, it will be observed in FIG. 19 that when an ammunition round 28 is fired in the gun 400, the projectile 28a of the round is propelled forwardly by propellant gas pressure through the gun bore 418. Just before emerging from the front end of the bore, the projectile uncovers the passage within the propellant gas conduit 424 which communicates the forward end of the bore to the forward end of the actuator cylinder 422. Propellant gas then flows through the conduit into the cylinder and drives the actuator plunger 426 rearwardly. The conduit 424 is so located along the gun barrel 412 that sufficient propellant gas will enter the cylinder to drive the plunger through its complete stroke. After firing, the propellant gas vents from cylinder 422 back through the conduit 424 and the bore 418 to atmosphere to permit spring return of the actuator plunger 426 to its forward limiting position. It is now evident, therefore, that during firing of each ammunition round 28 in the gun 400, the breech cylinder 408 is driven in the counterclockwise direction in FIGS. 20 through 22 by propellant gas pressure and in the clockwise direction by the action of the actuator spring 438.

According to the present invention, the cylinder cam track 440 is shaped in such a way that each full rearward stroke of the actuator plunger 426 drives the breech cylinder 408 from its firing position of FIGS. 19 and 20, through its infeed position of FIG. 21, to its ejection position of FIG. 22. Each full forward return stroke of the plunger drives the cylinder in the opposite direction from its ejection position, through its infeed position, back to its firing position.

Gun 400 is equipped with firing means 442 for firing each ammunition round 28 in firing position. The illustrated firing means are identical to the firing means embodied in the earlier disclosed gun 12 of the invention. Accordingly, it is not necessary to describe the firing means 442. It is significant to recall, however, that the firing means may be selectively set for either manual or automatic firing.

In the gun 400, as in the earlier described gun 300 of the invention, it may be necessary to manually rotate the beech cylinder 408 to locate the first ammunition round 28 in firing position. Such manual rotation on the cylinder may be accomplished in various ways. In the particular gun illustrated, the rod 428 of the actuator plunger 426 comprises a rack having gear teeth 444 formed along one side thereof. Rotatably mounted in the front end of the breech frame 404, and meshing with the rack teeth 444, is a pinion 446. Pinion 446 has a shaft 448 journaled in the frame and extending beyond one side of the frame to receive a crank 450. This crank is removable from the pinion shaft 448. It is evident, therefore, that the actuator plunger 426 may be driven manually in the axial direction, by rotation of the crank 450, to drive the breech cylinder 408 to its infeed and ejection positions.

As noted earlier, each of the present guns may fire either cased ammunition of the type disclosed in the earlier mentioned prior art patents, or copending application entitled "Ammunition Improvements to Permit Firing of a Conventional Closed Chamber Cartridge in an Open Chamber Breech Mechanism," semicombustible ammunition of the type disclosed in the aforementioned copending application entitled "Semicombustible Ammunition for Open Chamber Breech Mechanism," or caseless ammunition of the type disclosed in the aforementioned copending application entitled "Sealed Open Chamber Breech Mechanism and Caseless Ammunition Therefor." In the earlier described oscillatory cylinder guns 12 and 200 of the invention, the infeed and ejection openings in the breech frame are located at opposite sides of the frame. As a consequence, the cylinder may rotate to all three of its infeed, firing, and ejection positions during each firing cycle of the guns, regardless of the type of ammunition fired. In the gun 400 under discussion, on the under hand, the infeed and ejection openings in the breech frame 404 are located at the same side of the frame as may be readily observed in FIGS. 20 through 22. In this regard, it will be seen that if the breech cylinder 408 rotated from firing position to ejection position and back to firing position when firing caseless ammunition rounds, a live round would enter the cylinder firing chamber 410 upon rotation of the chamber through infeed position during rotation of the cylinder from firing position to ejection position. The live round would then be ejected without firing. Such ejection of the live round might be prevented by covering the lower ejection opening in the breech frame when firing caseless ammunition rounds. The particular gun which has been selected for illustration in the drawings, however, is equipped with a retractable stop 452 for this purpose. Thus, when firing caseless ammunition rounds, the stop 452 is extended into the path of the actuator plunger 426 to limit rotation of the breech cylinder 408 between its firing and infeed positions. When firing cased or semicombustible ammunition, the stop 452 is retracted to permit the plunger to travel through its full stroke length. In this connection, it is significant to observe that when firing cased or semicombustible ammunition, the firing chamber 410 will contain a spent cartridge case after firing which will prevent the entrance of a live round into the chamber during rotation of the latter from firing position to ejection position. The live round will then enter the empty chamber during subsequent return of the latter to firing position.

The operation of the gun 400 is now believed to be obvious. Thus, the gun is conditioned for firing by filling the ammunition hopper 415 with ammunition rounds 28 and then manually rotating the breech cylinder 408 from firing position to infeed position and back to firing position to locate the first round in firing position. During this manual rotation of the cylinder, the firing means 442 are inactivated in the manner explained earlier in connection with the gun 12. At this point, the gun is fired by releasing the firing pin of the firing means. The projectile 28a of the fired round is then propelled forwardly through the gunbore 418 by propellant gas pressure. Just prior to emergence of the projectile from the bore, the projectile uncovers the passage in the gas conduit 424 to permit propellant gas flow into the actuator cylinder 422. The actuator plunger 426 is then driven rearwardly by propellant gas pressure and finally forwardly by the action of its spring 438 to drive the cylinder 408 from firing position to infeed or ejection position, depending upon the type of ammunition being fired and the corresponding position of the plunger stop 452. In the event that the firing means 442 are set for automatic firing, the gun 400 will continue to fire automatically until the ammunition hopper is empty. On the other hand, if the firing means are set for manual firing, each live ammunition round will be rotated to firing position but will not be fired until the firing pin of the firing means is manually released in the manner explained earlier.

In the propellant gas pressure operated gun 400, the forward longitudinal section of the cam track 440 is dimensioned to delay rotation of the cylinder 408 from firing position until bore evacuation occurs and the firing chamber pressure drops. FIG. 23 illustrates a modified propellant gas cylinder actuator 414a which may be utilized, in lieu of that described above, to achieve such delay. This modified actuator includes a cylinder 422a which communicates with the gun barrel (not shown) through a connecting conduit 424a in the same manner as in the gun 400. Movable in the actuator cylinder 422a is a breech cylinder actuating plunger 426a which is drivably coupled to the breech cylinder (not shown) by cam and cam follower means (not shown) in the same manner as the actuator plunger 426 in the gun 400.

The major difference between the actuator 414a and the earlier described actuator 414 resides in the fact that the actuator 414a is equipped with a floating piston 454a which is located within the actuator cylinder 422a forwardly of the spring loaded actuator plunger 426a. Disposed between the plunger and piston is a return spring 456a.

A present gun employing the modified breech cylinder actuator 414a operates in much the same way as the gun 400, just described. In the case of the actuator 414a, however, the propellant gas pressure which enters the actuator cylinder 422a following firing of each ammunition round acts on the floating piston 454a and initially drives the latter rearwardly without moving the actuator plunger 426a. Eventually the floating piston drives the plunger rearwardly, either through the return spring 456a or by direct contact with the plunger, to rotate the breech cylinder in the same manner as described above in connection with the gun 400. The delay thus introduced by the floating piston is timed to permit bore evacuation before cylinder rotation.

The embodiments of the invention in which an exclusive property or privilege is claimed are defined as follows:

1. An open chamber breech mechanism comprising:
   a breech structure including a frame containing a chamber and having a firing strap along one longitudinal side of said chamber, a firing cylinder supported on said frame within said chamber for rotation on its central axis, said firing strap having an inner sealing surface which forms a boundary wall of said chamber and is cylindrically curved about said axis so as to be disposed in close conforming relation to the circumference of said cylinder, a bore opening to said chamber, a lateral ammunition infeed opening and a lateral ejection opening to said chamber between the ends of said cylinder, said cylinder containing a firing chamber opening laterally through the circumference of said cylinder and being rotatable to an ammunition infeed position wherein the open side of said firing chamber registers with said infeed opening for laterally receiving a round of ammunition through said opening, a firing position wherein the open side of said firing chamber is closed by a portion of said cylindrically curved firing strap surface and communicates with said bore, and an ejection position wherein the open side of said firing chamber registers with said ejection opening, and firing means for firing an ammunition round in said firing chamber when said firing chamber occupies said firing position to generate an explosion; and
   explosion actuated means drivably coupled to said cylinder for driving said cylinder through said positions including interengaging cam follower means and cam groove means which are driven in relative movement by a force produced by said explosion and along a path of relative movement having an initial portion parallel to the axis of said cylinder and a following portion inclined to said axis for exerting a positive rotary camming force on said cylinder after a time delay immediately following firing sufficient to enable evacuation of said bore and reduction of firing chamber pressure to a relatively low level at which said cylinder is free to turn on said axis, all in a manner such that neither the open side of said firing chamber nor said firing strap surface portion intersects the path of said relative movement, and means for retaining said cylinder in firing position during said delay.

2. An open chamber breech mechanism according to claim 1 wherein:
   said explosion actuated means drives said cylinder in oscillation in such manner that said firing chamber rotates in one direction from said firing position through said infeed position to said ejection position and in the opposite direction from said ejection position through said infeed position to said firing position.

3. An open chamber breech mechanism according to claim 1, wherein:
   said explosion actuated means drives said cylinder in unidirectional rotation in such manner that said firing chamber rotates in one direction from said firing position to said infeed position and in the same direction from said infeed position to said firing position, said path of relative movement of said interengaging means is a closed path which extends through a full 360° about said cylinder axis, and said interengaging cam follower and cam groove means are spaced axially of said cylinder from said firing chamber to locate said path in non-intersecting relation to the open side of said firing chamber and said firing strap surface portion.

4. An open chamber breech mechanism according to claim 1, wherein:
   said ammunition round contains a projectile and a propellant;
   said bore extends parallel to the rotation axis of said cylinder and said firing chamber opens forwardly to said bore in firing position, whereby said explosion propels said projectile forwardly through said bore and produces a rearward recoil force on said breech frame;
   said breech mechanism comprises a cradle supporting said breech frame for rearward recoil movement under the action of said recoil force and forward counter-recoil movement under the action of a counter-recoil force;
   means acting between said cradle and frame for exerting said counter-recoil force on said frame; and
   said interengaging cam follower means and cam groove means are carried by said cradle and cylinder, respectively, for relative movement along said path in response to recoil and counter-recoil movement of said breech frame relative to said cradle.

5. An open chamber breech mechanism according to claim 1, wherein:
   said explosion actuated means comprise a linear fluid pressure actuator including an actuator cylinder communicating at one end with said bore, a plunger in said actuator cylinder movable in the direction of the opposite actuator cylinder end in response to propellant gas pressure in said actuator cylinder, means for urging said plunger in the opposite direction in said actuator cylinder, and said interengaging cam follower means and cam groove means comprise a cam groove in the circumference of said firing cylinder spaced from the open side of said firing chamber and a cam follower on said plunger for driving said firing cylinder in response to movement of said plunger in said actuator cylinder.

6. An open chamber breech mechanism comprising:
   a breech structure including a frame containing a chamber and having a firing strap along one longitudinal side of said chamber, a cylinder supported on said frame within said chamber for oscillation on its central axis, said firing strap having an inner sealing surface which forms a boundary wall of said chamber and is cylindrically curved about said axis so as to be disposed in close conforming relation to the circumference of said cylinder, a lateral ammunition infeed opening and a lateral ammunition ejection opening to said chamber between the ends of said cylinder, a bore opening to said chamber, said cylinder containing a firing chamber opening laterally through the circumference of said cylinder and being rotatable in oscillation to locate said firing chamber in ammunition infeed position wherein the open side of said firing chamber registers with the infeed opening for laterally receiving a round of ammunition through said opening, a firing position wherein the open side of said firing chamber is closed by a portion of said cylindrically curved firing strap surface and communicates with said bore, and an ejection position wherein the open side of said firing chamber registers with said ejection opening, said infeed position being situated between said firing position and ejection position, and firing means for firing a round in said firing chamber when said firing chamber occupies said firing position to generate an explosion;

explosion actuated means for driving said cylinder in oscillation in response to firing of said round in said firing chamber and in such manner as to rotate said firing chamber from firing position through infeed position to ejection position and then back to infeed position immediately following firing including first and second interengaging means on said cylinder and frame, respectively, which are driven in relative movement by a force produced by said explosion to impart a rotary driving force to said cylinder in a manner such that neither the open side of said firing chamber nor said firing strap surface portion intersects the path of said relative movement;

return means for rotating said cylinder from infeed position to firing position comprising a spring which is tensioned by rotation of said cylinder from firing position to infeed position to urge said cylinder from infeed position to firing position; and latch means for releasably latching said cylinder in infeed position against return to firing position by said spring.

7. An open chamber breech mechanism according to claim 6 wherein:
said latch means include manual latch release means.

8. An open chamber breech mechanism according to claim 6 including:
latch release means for releasing said latch means in response to entrance of said round into said firing chamber.

9. A recoiling open chamber gun comprising:
a breech mechanism including a breech frame containing a chamber and having a firing strap along one longitudinal side of said chamber, a cylindrical carrier rotatably supported on said frame within said chamber for rotation on its central axis, said firing strap having an inner sealing surface which forms a boundary wall of said chamber and is cylindrically curved about said axis so as to be disposed in close conforming relation to the circumference of said carrier, a lateral ammunition infeed opening to said chamber between the ends of said carrier, a barrel extending forwardly from said breech frame parallel to said axis and containing a bore opening at its rear end to said chamber, said carrier containing a firing chamber opening laterally through the circumference and forwardly through the front end of said carrier, said carrier being rotatable to locate said firing chamber in an ammunition infeed position wherein the open side of said firing chamber registers with said infed opening for laterally receiving a round of ammunition through said opening, and a firing position wherein the open side of said firing chamber is closed by a portion of said cylindrically curved firing strap surface and opens forwardly to said bore, and firing means for firing a round in said firing chamber when in firing position;

the explosion generated during firing of a round in said firing chamber producing a rearward recoil force on said breech mechanism;

a cradle supporting said breech mechanism for rearward recoil movement under the action of said recoil force and forward counter-recoil movement under the action of a counter-recoil force;

counter-recoil means for producing said counter-recoil force on said breech mechanism;

coacting cam and cam follower means on said cradle and breech cylinder which undergo relative movement during the recoil and counter-recoil strokes of said breech mechanism to rotate said cylinder from firing position to infeed position in response to each recoil stroke and following counter-recoil stroke, and in a manner such that neither the open side of said firing chamber nor said firing strap surface portion intersects the path of said relative movement;

a spring for returning said carrier from infeed position to firing position; and latch means including manual latch release means for releasably latching said carrier in infeed position.

10. A recoiling open chamber gun comprising:
a breech mechanism including a breech frame containing a chamber and having a firing strap along one longitudinal side of said chamber, a cylindrical carrier supported on said frame within said chamber for rotation on its central axis, said firing strap having an inner sealing surface which forms a boundary wall of said chamber and is cylindrically curved about said axis so as to be disposed in close conforming relation to the circumference of said carrier, a lateral ammunition infeed opening to said chamber between the ends of said carrier, a barrel secured to and extending forwardly from the front end of said frame in spaced parallel relation to said axis and containing a bore opening at its rear end to said chamber, said carrier containing a number of uniformly spaced firing chambers each opening laterally through the circumference and longitudinally through the front end of said carrier, said carrier being rotatable to locate each firing chamber in an ammunition infeed position wherein the open side of the firing chamber registers with said infeed opening for laterally receiving a round of ammunition through said opening and a firing position, wherein the open side of said firing chamber is closed by a portion of said cylindrically curved firing strap surface and opens forwardly to said bore;

firing means for firing a round in each firing chamber when in firing position;

the explosion generated during firing of a round in each firing chamber producing a rearward recoil force on said frame;

a cradle supporting said frame for rearward recoil movement of said frame under the action of said recoil force and forward counter-recoil movement under the action of a counter-recoil force;

means for producing said counter-recoil force on said frame; and coacting cam and cam follower means on said cradle and carrier which are spaced axially of said carrier from said firing chamber and undergo relative movement during the recoil and counter-recoil movement of said frame to rotate said carrier to said positions in succession and in a manner such that neither the open side of said firing chambers nor said firing strap surface portion intersects the path of said relative movement.

11. An open chamber gun according to claim 5 including:
a floating piston in said actuator cylinder between said plunger and one cylinder end and a spring between said piston and plunger for introducing an additional time delay between firing and cylinder rotation.

12. A recoiling open chamber gun comprising:
a breech mechanism including a breech frame containing a chamber and having a firing strap along one longitudinal side of said chamber, a cylindrical carrier rotatably supported on said frame within said chamber for rotation on its central axis, said firing strap having an inner sealing surface which forms a boundary wall of said chamber and is cylindrically curved about said axis so as to be disposed in close conforming relation to the circumference of said carrier, a lateral ammunition infeed opening to said chamber between the ends of said carrier, a barrel extending forwardly from said breech frame parallel to said axis and containing a bore opening at its rear end to said chamber, said carrier containing a firing chamber opening laterally through the circumference and forwardly through the front end of said carrier, said carrier being rotatable to locate said firing chamber in an ammunition infeed position wherein the open side of said firing chamber registers with said infeed opening for laterally receiving a round of ammunition through said opening, and a firing position wherein the open side of said firing chamber is closed by a portion of said cylindrically curved firing strap surface and opens forwardly to said bore, and firing means for firing a round in said firing chamber when in firing position;

the explosion generated during firing of a round in said firing chamber producing a rearward recoil force on said breech mechanism;

a cradle supporting said breech mechanism for rearward recoil movement under the action of said recoil force and forward counter-recoil movement under the action of a counter-recoil force;

counter-recoil means for producing said counter-recoil force on said breech mechanism;

coacting cam and cam follower means on said cradle and breech cylinder which undergo relative movement during the recoil and counter-recoil strokes of said breech mechanism to rotate said cylinder from firing position to infeed position in response to each recoil stroke and following counter-recoil stroke, and in a manner such that neither the open side of said firing chamber nor said firing strap surface portion intersects the path of said relative movement;

a spring for returning said carrier from infeed position to firing position;

latch means for releasably latching said carrier in infeed position; and means for releasing said latch means in response to entrance of each round into said firing chamber.

13. An open chamber breech mechanism according to claim 1, including:

means for manually rotating said cylinder to said infeed, firing, and ejection positions.

14. An open chamber breech mechanism according to claim 1, including:

means for disengaging said cam follower means and cam groove means to permit free rotation of said cylinder, and means for manually rotating said cylinder when said cam follower means and cam groove means are disengaged.

References Cited

UNITED STATES PATENTS

| | | | |
|---|---|---|---|
| 353,676 | 12/1886 | Gregg | 42—33 |
| 584,631 | 6/1897 | Fosbery | 42—59 |
| 688,217 | 12/1901 | Whiting | 89—157 |
| 2,804,810 | 9/1957 | Stevens | 89—155 |
| 2,831,401 | 4/1958 | Dardick | 89—17 |
| 2,865,126 | 12/1958 | Dardick | 42—39.5 X |
| 2,876,680 | 3/1959 | Meyer et al. | 89—156 |
| 2,965,001 | 12/1960 | Bobco et al. | 89—155 X |
| 2,978,962 | 4/1961 | Ivy | 89—191 X |
| 3,030,723 | 4/1962 | Ivy | 89—191 X |
| 2,976,770 | 3/1961 | Fletcher | 89—155 X |
| 2,977,856 | 4/1961 | Fletcher | 89—155 X |

BENJAMIN A. BORCHELT, Primary Examiner

STEPHEN C. BENTLEY, Assistant Examiner

U.S. Cl. X.R.

89—33, 191